US008507094B2

(12) United States Patent
Woo et al.

(10) Patent No.: US 8,507,094 B2
(45) Date of Patent: Aug. 13, 2013

(54) SUPERPARAMAGNETIC CLUSTER-NANO PARTICLES-POROUS COMPOSITE BEAD AND FABRICATION METHOD THEREOF

(75) Inventors: Kyoungja Woo, Seoul (KR); Wooyoung Park, Daegu (KR)

(73) Assignee: Korea Institute of Science and Technology (KR)

( * ) Notice: Subject to any disclaimer, the term of this patent is extended or adjusted under 35 U.S.C. 154(b) by 252 days.

(21) Appl. No.: 12/979,870

(22) Filed: Dec. 28, 2010

(65) Prior Publication Data

US 2011/0297871 A1 Dec. 8, 2011

(30) Foreign Application Priority Data

Jun. 4, 2010 (KR) .................. 10-2010-0053058
Nov. 2, 2010 (KR) .................. 10-2010-0108372

(51) Int. Cl.
*B32B 5/16* (2006.01)
(52) U.S. Cl.
USPC .......... 428/403; 436/526; 436/532; 436/533; 436/84; 435/157; 977/773
(58) Field of Classification Search
USPC ................. 428/403; 436/526, 532, 533, 84; 435/157; 977/773
See application file for complete search history.

(56) References Cited

U.S. PATENT DOCUMENTS

| | | | | |
|---|---|---|---|---|
| 6,117,517 | A * | 9/2000 | Diaz et al. ................. | 428/102 |
| 7,795,041 | B2 * | 9/2010 | Hatton et al. .............. | 436/526 |
| 8,071,395 | B2 * | 12/2011 | Davis et al. ............... | 436/524 |
| 8,114,489 | B2 * | 2/2012 | Nemat-Nasser et al. ..... | 428/34.1 |
| 2005/0215687 | A1 * | 9/2005 | Hatton et al. .............. | 524/431 |

FOREIGN PATENT DOCUMENTS

| | | |
|---|---|---|
| CN | 1523076 A | 8/2004 |
| CN | 101037205 A | 9/2007 |
| CN | 101530766 A | 9/2009 |
| JP | H09-19292 | 1/1997 |
| JP | 2005-336530 | 12/2005 |
| JP | 2007-530397 | 11/2007 |
| JP | 2008-127454 | 6/2008 |
| JP | 2008-150696 | 7/2008 |
| JP | 2010-509404 | 3/2010 |
| WO | WO02102584 A1 | 12/2002 |

OTHER PUBLICATIONS

Qiao Zhang, Jianping Ge, James Goebl, Yongxing Hu, Yugang Sun, and Yadong Yin, "Tailored Synthesis of Superparamagnetic Gold Nanoshells with Tunable Optical Properties", Advanced Materials, (DE), Wiley-VCH, May 4, 2010, vol. 22, No. 17, pp. 1905-1909.
Xiaojun Ji, Ruping Shao, Andrew M. Elliott, R. Jason Stafford, Emilio Esparza-Coss, James A. Bankson, Gan Liang, Zhi-Ping Luo, Keeseong Park, John T. Markert, and Chun Li, "Bifunctional Gold Nanoshells with a Superparamagnetic Iron Oxide-Silica Core Suitable for Both MR Imaging and Photothermal Therapy", Journal of Physical Chemistry C, (US), American Chemical Society, Apr. 6, 2007, vol. 111, pp. 6245-6251, (published on web).
Christina Graf, Sofia Dembski, Andreas Hofmann, and Eckart Ru hl, "A General Method for the Controlled Embedding of Nanoparticles in Silica Colloids", Langmuir, (US), American Chemical Society, May 24, 2006, vol. 22, pp. 5604-5610, (published on web).
Chinese Office Action issued for corresponding Chinese Patent Application No. 201110034617.1 dated May 15, 2013.

* cited by examiner

*Primary Examiner* — Leszek Kiliman
(74) *Attorney, Agent, or Firm* — Ostrolenk Faber LLP

(57) ABSTRACT

The present invention relates to a composite bead and a fabrication method thereof, and particularly, to a porous composite bead comprising superparamagnetic cluster and nanoparticles, such as light-emitting nanoparticles, magnetic nanoparticles, metallic nanoparticles, metal oxide nanoparticles and the like, and a fabrication method thereof.

19 Claims, 5 Drawing Sheets

SUPERPARAMAGNETIC CLUSTER-NANO PARTICLES-POROUS COMPOSITE BEAD AND FABRICATION METHOD THEREOF

CROSS-REFERENCE TO A RELATED APPLICATION

Pursuant to 35 U.S.C. §119(a), this application claims the benefit of earlier filing date and right of priority to Korean Application 10-2010-0053058, filed on Jun. 4, 2010 and Korean Application 10-2010-0108372, filed on Nov. 2, 2010, the content of which is incorporated by reference herein in its entirety.

BACKGROUND OF THE INVENTION

1. Field of the Invention

The present invention relates to a composite bead and a fabrication method thereof, and particularly, to a porous composite bead comprising superparamagnetic cluster and nanoparticles, such as light-emitting nanoparticles, magnetic nanoparticles, metallic nanoparticles, metal oxide nanoparticles and the like, and a fabrication method thereof.

2. Background of the Invention

A composite bead containing a light-emitting material or metal has excellent physicochemical characteristics so as to be expected to have high usability for a material for LEDs or displays, photonic crystal lasers, biosensors, environment-related sensors and the like, accordingly, many researches for various types of composite beads are widely undergoing.

Meanwhile, in order to use composite beads in fields requiring fast analysis within several minutes, such as portable sensors or environment-related sensors, it may be better to take a shorter time for recovering composite beads and have superior dispersion properties. Especially, a recovering process should be performed within a short time using superparamagnetic properties or the like, and the superior dispersion properties are required when it is not a recovering process.

A research for allowing magnetic nanoparticles to be situated near a bead surface has been conducted, however, the number of superparamagnetic nanoparticles was not able to exceed more than 5% of the number of fluorescent nanoparticles due to the characteristic of the fabrication process, which caused difficulty to recover composite beads using a magnetic field. For the composite beads according to the related art, the superparamagnetic nanoparticles occupied 0.05% or less of the entire weight of the composite bead in a size of submicron to micron. Hence, it took a long time of about 5 to 10 hours to recover composite is beads by setting a typical laboratory magnet thereto.

Even in structures that a mixture of superparamagnetic nanoparticles and fluorescent nanoparticles was present within the bead (Journal of the American Chemical Society, 2006, 128, 688-689), like a raisin bun, or near a surface of the bead (ACS nano, 2008, 2, 197-202), since the weight of superparamagnetic nanoparticles merely occupied 0.5% or less of the composite bead, it also took a long time to be attracted under a magnetic field. Furthermore, due to the structure like the plum cake, the fluorescence emitted from the fluorescent nanoparticles situated deep in the composite beads was drastically decreased rather than that emitted from the fluorescent nanoparticles present independently.

In the meantime, the use of ferromagnetic or ferrimagnetic particles has an advantage of a quick response under a magnetic field; however, even for non-existence of a magnetic field, a strong cohesion is exhibited among magnetic particles, accordingly, the composite bead particles including those particles problematically have an extremely low dispersion properties.

Hence, a structure is required in which the dispersion property in case of the non-existence of the magnetic field is improved by increasing the content of superparamagnetic particles within the composite bead and faster attraction is expected upon applying a magnetic field. Also, in addition to solving the problem, there are needed composite beads having superior functionalities, such as optical properties of nanoparticles in a composite bead structure.

That is, composite beads, which are attracted by a typical laboratory magnet within at least several minutes and simultaneously has an excellent functionality such as optical property and exhibits a superior dispersion property in case of non-existence of a magnetic field, are more preferable to be used for sensors or the like. However, any composite bead satisfying such conditions has not been introduced yet.

SUMMARY OF THE INVENTION

Therefore, in order to overcome the problems of the related art, an object of the present invention is to provide composite beads, which have superior dispersion properties upon non-existence of a magnetic field, are recovered under a magnetic field at a fast speed, and are capable of providing customized functions, such as optical properties by having excellent functionalities, such as optical properties, due to inclusion of nanoparticles with optical properties.

To achieve these and other advantages and in accordance with the purpose of the present invention, as embodied and broadly described herein, there is provided a superparamagnetic cluster-nanoparticles-porous composite bead including a superparamagnetic cluster ('superparamagnetic cluster' in this specification indicates a cluster composed of superparamagnetic nanoparticles), a porous bead veiling the cluster, and nanoparticles radially distributed on an inner concentric sphere adjacent to an outer surface of the porous bead, wherein the nanoparticle is at least one type selected from a group consisting of light-emitting nanoparticle, magnetic nanoparticle, metallic nanoparticle and metal oxide nanoparticle, or a superparamagnetic cluster-nanoparticles-porous composite bead including a superparamagnetic cluster, a central porous bead veiling the cluster, nanoparticles radially coupled to an outer surface of the central porous bead by virtue of an electrostatic attraction, and a porous layer formed to veil the nanoparticles, wherein the nanoparticle is at least one type selected from a group consisting of light-emitting nanoparticle, magnetic nanoparticle, metallic nanoparticle and metal oxide nanoparticle.

To achieve these and other advantages and in accordance with the purpose of the present invention, as embodied and broadly described herein, there is also provided a method for fabricating a superparamagnetic cluster-nanoparticles-porous composite bead including (a) mixing a first solution containing a superparamagnetic cluster with materials needed for fabrication of a porous body so as to prepare a solution containing the cluster and a central porous bead grown to veil a surface of the cluster, (b) preparing a second solution by coupling molecules having a first charge onto the outer surface of the central porous bead, (c) preparing a third solution, which contains nanoparticles and has a second charge reverse to the first charge, (d) mixing the second solution obtained at step (b) with the third solution such that nanoparticles are coupled onto the outer surface of the central porous bead by virtue of an electrostatic attraction, and (e) mixing the solution obtained at step (d) with materials needed for fabrication of the porous body to form a porous layer to veil the nanoparticles, wherein the nanoparticle at step (c) is at least one selected from a group consisting of light-emitting nanoparticle, magnetic nanoparticle, metallic nanoparticle and metal oxide nanoparticle.

The cluster of superparamagnetic nanoparticles exhibits a superparamagnetic property and has a sufficiently high saturation magnetization, so as to provide high dispersibility and exhibit a characteristic of being fast attracted by a magnetic field, thereby achieving a superparamagnetic cluster-nanoparticles-porous composite bead having excellent superparamagnetiic property (i.e., quickly recovered under a magnetic field) and dispersibility (i.e., dispersibility in case of non-existence of a magnetic field). Also, a structure in which the superparamagnetic cluster is present at the inside of the composite bead than another nanoparticles, having optical properties or the like, effectively exhibits other functionalities, such as optical properties, so the present disclosure can obtain a superparamagnetic cluster-nanoparticles-porous composite bead having superior functionalities such as optical properties and increased durability.

Meanwhile, in accordance with the fabrication method, the superparamagnetic cluster-nanoparticles-porous composite bead can be fabricated in a quantitative yield in the range of several tens nanometers to several microns in size.

The thusly-fabricated superparamagnetic-light-emitting or superparamagnetic-plasmonic porous composite bead exhibits a fast response under a magnetic field, so as to be very useful as a material for a portable biosensor or environment-related sensor, and be utilized as material for video imaging which obtains both a magnetic resonance image and a fluorescent image, plasmon image and the like.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this is specification, illustrate embodiments of the invention and together with the description serve to explain the principles of the invention.

In the drawings.

DETAILED DESCRIPTION OF THE INVENTION

A superparamagnetic cluster-nanoparticles-porous composite bead according to the present invention may be composed of a superparamagnetic cluster, a porous bead covering the cluster and nanoparticles radially distributed on an inner concentric sphere adjacent to an outer surface of the porous bead, and the nanoparticle may be at least one selected from a group consisting of light-emitting nanoparticle, magnetic nanoparticle, metallic nanoparticle and metal oxide nanoparticle.

Figure 1:
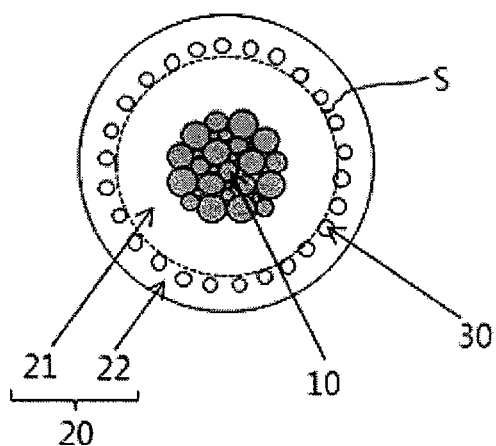
FIG. 1 is a sectional view of a superparamagnetic cluster-nanoparticle-porous composite bead in accordance with the present invention.

FIG. 1 is a sectional view of a superparamagnetic cluster-nanoparticles-porous composite bead in accordance with the present invention. A superparamagnetic cluster-nanoparticles-porous composite bead in accordance with one aspect of the present invention may include a cluster 10 composed of superparamagnetic nanoparticles, a porous bead covering the cluster 10 in its center, and nanoparticles 30 radially coupled onto an inner concentric sphere near a surface of the porous bead 20 by virtue of an electrostatic attraction.

In the present invention, the cluster 10 composed of the superparamagnetic nanoparticles is present in the center of the porous bead 20 to provide a superparamagnetic property to the composite bead, and the nanoparticles 30 are located in all directions at the same distance from the center so as to be doped inside near the surface of the porous bead 20 with forming a spherical shell shape formed of a nanoparticle layer. Especially, for a light-emitting nanoparticle as one example of functional nanoparticles, since the light-emitting nanoparticles 30 are present on the surface of the concentric sphere as an electrostatic monolayer, the most efficient light absorption can be ensured while a self-quenching can be minimized, and also an increased fluorescence can be emitted or an increased plasmon band can be obtained by virtue of a resonance coupling with the porous bead 20. Also, the light-emitting nanoparticles 30 are locked within the porous bead 20 with being veiled by a porous layer 22, accordingly, light stability and durability can be more enhanced than the light-emitting nanoparticles 30 being present individually free in solution or without the porous layer 22, and simultaneously a light emitting intensity or the plasmon band intensity can be further enhanced by the resonance coupling between the light-emitting nanoparticles 30 and the porous bead 20.

In addition to the light-emitting nanoparticles, another nanoparticles having a specific function, namely, superparamagnetic nanoparticles, metallic nanoparticles or metal oxide nanoparticles can be mixed together for providing the corresponding function.

Also, the porous bead 20 may be composed of a central porous bead having the surface of the concentric sphere coupled to the nanoparticles as an outer surface, and a porous layer formed to veil the nanoparticles coupled to the outer surface of the central porous bead due to an electrostatic attraction. That is, the porous bead 20 may be composed of a central porous bead 21 surrounding is the cluster 10 composed of superparamagnetic nanoparticles and having an outer surface S coupled to the nanoparticles 30, and a porous layer 22 formed to veil the nanoparticles 30 coupled to the surface of the central porous bead 21 by the electrostatic attraction.

The concentric sphere may preferably have a radius r, which is more than 0.5 times and less than one time of a distance (radius, R) from the center to the surface of the porous bead 20 including the cluster. If the concentric sphere has the radius r less than 0.5 times of the radius R, the nanoparticles 30 may be doped onto a too deep position within the porous bead 20, functionalities, such as optical properties, absorbed from the exterior or emitted out of the porous bead 20 becomes too weak. The upper limit set to less than one time of the radius R indicates that the nanoparticles 30 are prevented from being exposed out of the porous bead 20.

One of the cores of the present invention is to solve the problem of a time, which was taken for 5 to 10 hours to attract a porous bead by use of a magnet due to a less content of the superparamagnetic nanoparticles and a heavy weight of the bead itself when the nanoparticles were doped on the porous bead in a form of a mixture of individual particles, in fabrication of a porous bead having superparamagnetic property and functionality such as optical property. That is, a shell composed of nanoparticles in the form of a concentric circle is doped near the surface of the porous bead to increase a functionality intensity such as optical property or a plasmon band property, and here, a cluster composed of superparamagnetic nanoparticles is placed in the center of the porous bead, thereby improving the structure and increasing the content of superparamagnetic nanoparticles over 20% so as to decrease a time, which is taken for the superparamagnetic nanoparticles to be attracted, within several minutes. In the related art, several efforts for situating nanoparticle mixture (magnetic nanoparticles and light-emitting nanoparticles) within the porous bead were often made; however, since the nanoparticle mixture composed of individual nanoparticles were doped, a magnetic attraction was extremely weak as compared to a weight of a finally-obtained composite bead. Consequently, it took much time to attract the particles by a magnet, and thereby such bead is unable to be used upon requirement of a fast effect, such as a portable sensor. Hence, the present inventors design a material with a composite structure capable of utilizing superparamagnetic property and functionality such as optical property the most effectively, so as to invent a superparamagnetic cluster-nanoparticles-porous composite bead having a cluster composed of superparamagnetic nanoparticles in its center and doped with a photo-functional nanoparticle layer having optical property or the like near its surface.

In the meantime, the layer in the present invention indicates not only a complete layer but also a layer that is present on a concentric sphere without being completely formed.

A cluster may have a size in the range of 50 nm to 1 μm, an inner diameter of the central porous bead may be greater than a diameter of the cluster, and an outer diameter of the central porous bead may be less than 10 μm. A size of each nanoparticle may be more than 1 nm and smaller than 100 nm, and a thickness of the porous layer may be greater than a diameter of each nanoparticle and less than 100 nm. The superparamagnetic cluster may preferably be composed of superparamagnetic nanoparticles. Accordingly, in order to sufficiently exhibit a strong magnetism, the diameter of the clusters should be at least more than 50 nm. However, if the diameter is greater than 1 μm, the diameter of the finally obtained composite bead may become too large, thereby decreasing the usability thereof. When a size of a quantum dot as a semiconductor nanoparticle is typically in the range of 1 nm to 20 nm, the luminance characteristic is exhibited due to a quantum confinement effect. Upon having a size in the range of 1 nm to 100 nm, the gold or silver nanoparticle may well exhibit plasmon properties and it may be preferable to form a uniform monolayer. If the thickness of the porous layer increased, the luminance intensity increased up to 20 nm and then started to decrease. When the thickness of the porous layer then exceeded 100 nm, the luminance intensity was checked to be similar to the previous luminance intensity, thereby deciding the thickness of the porous layer of the present invention.

The concentric sphere, in which the nanoparticles are distributed, may be located between inner surface and outer surface of the porous bead and the porous bead may be composed of one or a mixture of two or more selected from a group consisting of silica, titania, zirconia and zeolite. Here, the present invention may not be limited to this composition, but any porous bead composed of an inorganic material with a high refractive index can be applicable.

The superparamagnetic cluster-nanoparticles-porous composite bead according to the present invention may be composed of a superparamagnetic cluster, a central porous bead surrounding the cluster, nanoparticles coupled to an outer surface of the central porous bead in all directions by virtue of an electrostatic attraction, and a porous layer formed to veil the nanoparticles. The nanoparticle may be at least one selected from a group consisting of light-emitting nanoparticle, magnetic nanoparticle, metallic nanoparticle and metal oxide nanoparticle. Each of the nanoparticles may be located at the same distance from the center of the porous bead so as to form an electrostatic monolayer. The central porous bead may be made of the same material as or different from that of the porous layer. The central porous bead and the porous layer may be made of at least one selected from a group consisting of silica, titania, zirconia and zeolite.

The light-emitting nanoparticles according to the present invention may be at least one selected from a group consisting of II-VI compound semiconductor nanocrystals, III-V compound semiconductor nanocrystals and inorganic phosphors, and may have one core/shell structure of (1) to (3) as follows.

(1) II-VI compound semiconductor nanocrystal (core)/II-VI compound semiconductor nanocrystal (shell), (2) III-V compound semiconductor nanocrystal (core)/III-V compound semiconductor nanocrystal (shell), and (3) III-V compound semiconductor nanocrystal (core)/II-VI compound semiconductor nanocrystal (shell).

II-VI compound semiconductor nanocrystal may be at least one selected from a group consisting of CdS, CdSe, CdTe, ZnS, ZnSe, ZnTe, HgS, HgSe and HgTe, III-V compound semiconductor nanocrystal may be at least one selected from a group consisting of GaN, GaP, GaAs, InP and InAs, and an inorganic phosphor may be at least one selected from a group consisting of $La_2O_2S$:Eu, $Li_2Mg(MoO_4)$:Eu, Sm, $(Ba, Sr)_2SiO_4$:Eu, ZnS:Cu,Al, $SrGa_2S_4$:Eu, $Sr_5(PO_4)_3$Cl:Eu, $(SrMg)_5PO_4Cl$:Eu and $BaMg_2Al_{16}O_{27}$:Eu.

For instance, the light-emitting nanoparticles 30 may have the structure of II-VI compound semiconductor nanocrystal (core)/II-VI compound semiconductor nanocrystal (shell) (e.g., CdSe/ZnS), III-V compound semiconductor nanocrystal (core)/III-V compound semiconductor nanocrystal (shell) (e.g., InP/GaN), and III-V compound semiconductor nanocrystal (core)/II-VI compound semiconductor nanocrystal (shell) (e.g., InP/ZnS). However, the present invention may not be limited to those structures.

The superparamagnetic nanoparticle according to the present invention may be at least one selected from a group consisting of FeO, $Fe_2O_3$, $Fe_3O_4$, $MnFe_2O_4$, $CoFe_2O_4$, $NiFe_2O_4$, Fe, Co and Ni. Meanwhile, the superparamagnetic nanoparticle constructing the superparamagnetic cluster may also be at least one nanoparticle selected from the group consisting of FeO, $Fe_2O_3$, $Fe_3O_4$, $MnFe_2O_4$, $CoFe_2O_4$, $NiFe_2O_4$, Fe, Co and Ni. For providing desired functions, the superparamagnetic nanoparticles constructing the superparamagnetic cluster may be different from another nanoparticle forming the concentric layer in the porous bead.

The metal may be at least one selected from a group consisting of Au, Ag, Fe, Co and Ni. Also, the metal oxide may be at least one selected from a group consisting of FeO, $Fe_2O_3$, $Fe_3O_4$, $MnFe_2O_4$, $CoFe_2O_4$ and $NiFe_2O_4$.

A method for fabricating a superparamagnetic cluster-nanoparticles-porous composite bead according to the present invention may include (a) mixing a first solution containing a superparamagnetic cluster with materials needed for fabrication of a porous body so as to prepare a solution containing the cluster and a central porous bead grown to veil a surface of the cluster, (b) preparing a second solution by coupling molecules with a first charge onto the outer surface of the central porous bead, (c) preparing a third solution, which contains nanoparticles and has a second charge reverse to the first charge, (d) mixing the second solution obtained at step (b) with the third solution such that nanoparticles are coupled onto the outer surface of the central porous bead by virtue of an electrostatic attraction, and (e) mixing the solution obtained at step (d) with is materials needed for fabrication of the porous body to form a porous layer to cover the nanoparticles. The nanoparticle at step (c) may be at least one type selected from a group consisting of light-emitting nanoparticle, magnetic nanoparticle, metallic nanoparticle and metal oxide nanoparticle.

The first solution at step (a) may be a solution in which a material having two or more carboxyl groups is added into a solution containing the cluster of superparamagnetic nanoparticles, and then dispersed through an ultrasonic treatment. The material having the two or more carboxyl groups may be trisodium citrate, dimercaptosuccinic acid, aspartic acid or acrylate oligomer, and the molecule having the first charge may be a molecule having aminopropyl groups.

The step (d) may be performed to adjust pH of each solution such that the second solution and the third solution can be a monodispersed solution.

The superparamagnetic porous bead according to the present invention may be in a spherical shape, and in some cases, may contain a small amount of dumbbell shapes formed by coupling of two or more superparamagnetic porous beads.

EXAMPLE

Hereinafter, the present invention will be described in more detail with reference to the preferred examples and the accompanying drawings. Here, the preferred examples of the present invention are merely illustrative, so they may not be construed as limitation of the present invention.

Example 1

Figure 2:
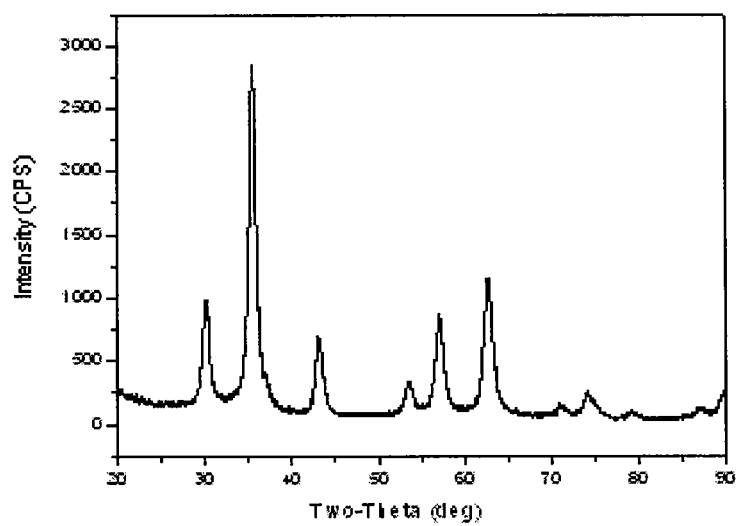
FIG. 2 is an XRD pattern graph of the superparamagnetic cluster fabricated at step (1) according to a first embodiment of the present invention.
Figure 3:
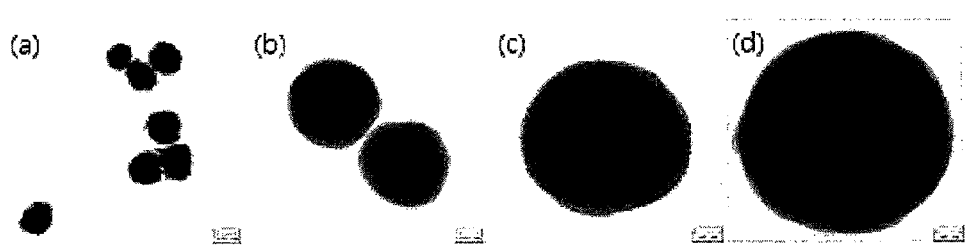
FIG. 3 is a transmission electronic microscopic (TEM) image of each of the following particles according to the first embodiment of the present invention:
(a) superparamagnetic cluster fabricated at step (1);
(b) silica composite bead, fabricated at step (2), containing superparamagnetic cluster in a center;
(c) silica composite bead, fabricated at step (5), having a surface doped with a quantum dot layer; and
(d) superparamagnetic cluster-light-emitting nanoparticles-silica composite bead fabricated at step (6).
Figure 4:
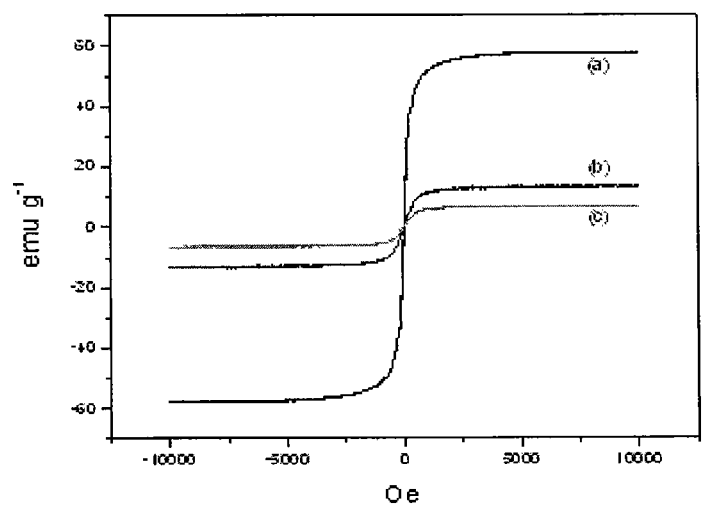
FIG. 4 shows a magnetic hysteresis loop of each of the following particles in accordance with the first embodiment of the present invention:
(a) superparamagnetic cluster fabricated at step (1);
(b) silica composite bead, fabricated at step (2), containing superparamagnetic cluster in a center; and
(c) superparamagnetic cluster-light-emitting nanoparticles-silica composite bead fabricated at step (6).

Fabrication of Porous Composite Bead Containing Superparamagnetic Cluster (about 150 nm) and Light-Emitting Nanoparticles (1) Fabrication of Superparamagnetic Cluster $FeCl_3$ (0.65 g, 4.0 mmol) and trisodium citrate (0.20 g, 0.68 mmol) were melted in 20 mL of ethylene glycol, and then 1.20 g of sodium acetate was added thereto to be stirred for 30 minutes. The solution was then conveyed to an autoclave and sealed, followed by reaction in 200° C. oven for 12 hours, thereby fabricating a superparamagnetic cluster. After cooling this solution at a room temperature, the cluster was washed once with ethanol and distilled water, respectively, and attracted for recovery using a magnet. The recovered clusters were dispersed and kept in 20 mL of ethanol. This solution is referred to as 'solution A' hereinafter. Part of the solution A underwent XRD, TEM and magnetic hysteresis analysis, and their results were shown in FIG. 2, (a) of FIG. 3 and (a) of FIG. 4. As a result of TEM analysis, an average size of the superparamagnetic cluster was about 150 nm. Here, even if a cluster is fabricated by any method different from that in the example, it may be used for fabricating the porous composite bead according to the present invention.

(2) Fabrication of Superparamagnetic Cluster-Porous Composite Bead Containing Superparamagnetic Cluster in Center Thereof 2.5 mL of the solution A prepared at step (1) was poured in 1 L flask and mixed with ethanol, thereby preparing 0.5 L solution. The solution was added with 50 mL of deionized distilled water and 0.225 g of trisodium citrate to be then stirred, followed by treatment in an ultrasonic bath for 10 minutes. The resultant solution was mixed with 15 mL of ammonium hydroxide and stirred for 1 hour. 22.5 mL of tetraethyl orthosilicate (TEOS) was then added to the solution to be stirred for 10 to 14 hours at a temperature of 20° C., thereby fabricating a magnetic nanoparticle cluster-silica porous composite bead containing a superparamagnetic nanoparticle cluster in a center thereof. The magnetic porous bead was washed several times by use of a magnet and ethanol and dispersed in 20 mL of ethanol for storage. This solution is referred to as 'solution B.' TEM image of the solution B and the result of the magnetic hysteresis analysis executed for part of the solution B were shown in (b) of FIG. 3 and (b) of FIG. 4.

In the meantime, during the process of fabricating the superparamagnetic porous bead comprising the superparamagnetic cluster by using part of the solution A fabricated at step (1), if a reaction was made without adding trisodium citrate according to the conventional method, a silica shell was formed on a surface on which the superparamagnetic clusters are agglomerated or coupled in a shape of chain. In order to overcome such phenomenon, the trisodium citrate was added so as to successfully fabricate the superparamagnetic porous bead. That is, the trisodium citrate was dissociated into trianion to be adsorbed onto the surfaces of the superparamagnetic nanoparticle cluster and the silica, thereby generating an electrostatic repulsive force, whereby the phenomenon of agglomerating among the clusters or the magnetic porous beads can be avoided. In other words, the small amount of trisodium citrate acts as glue at step (1) to clump the superparamagnetic nanoparticles to create the cluster, whereas the excessive amount of trisodium citrate acts as a dispersing agent at step (2) to prevent the superparamagnetic clusters from being agglomerated.

(3) Fabrication of Polycationic Magnetic Silica Bead Aqueous Solution 20 mL of the superparamagnetic silica bead solution fabricated at step (2) was mixed with 80 mL of ethanol, thereby preparing 100 mL of solution, to which 3 mL of ammonium hydroxide and 0.011 mL of aminopropyltrimethoxysilane were then added to be stirred for 16 hours. This solution was washed with methanol through centrifugation. The resultant solution was dispersed in 20 mL of distilled water and added with several drops of diluted hydrochloric acid, thereby adjusting pH of the solution approximately to 6. As a result of analyzing FT-IR spectrum of the silica bead, N—H peak was exhibited at 1630 and 1576 $cm^{-1}$ and C—H peak at 2939 $cm^{-1}$, accordingly, the coupling of aminopropyl groups was checked. When this solution was used for the reaction at the following step (5), the pH of the solution was adjusted approximately to 4 to increase polycationic property for use.

Figure 5:
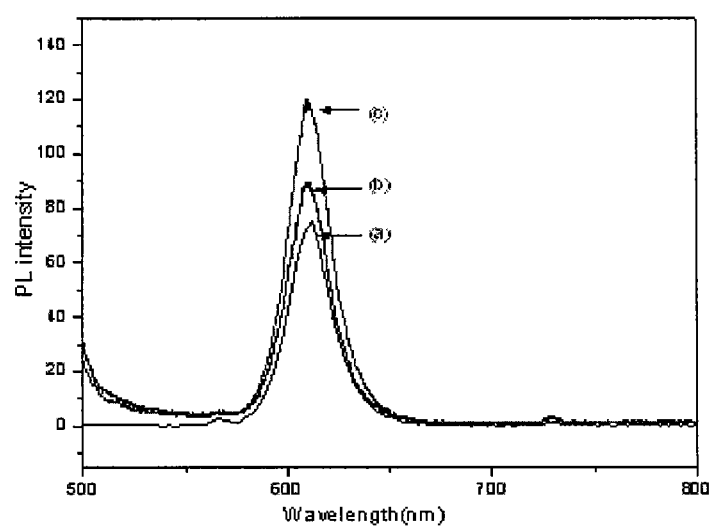
FIG. 5 is a fluorescence spectrum graph of each of the following solutions:
(a) a quantum dot solution, fabricated at step (4) according to the first embodiment, coupled with chargeable molecules;
(b) a superparamagnetic cluster-silica bead solution, fabricated at step (5) of the first embodiment, having a surface doped with a quantum layer; and
(c) a superparamagnetic cluster-light-emitting nanoparticles-silica composite bead solution fabricated at step (6) of the first embodiment.

(4) Fabrication of Polyanionic Monodispersed Quantum Dot CdSe/CdS($—SCH_2CH_2CO_2^-)_{ex}$ Aqueous Solution 2 Ml of CdSe/CdS-ODA quantum dot solution ($2 \times 10^{-5}$M) in a core/shell structure, having a surface protected with octadecylamine (ODA) was placed under vacuum to remove a hexane solvent, thereby dispersing in 4 Ml of chloroform. Afterwards, an excessive amount of methanol solution, in which 0.05M of mercaptopropionate (MPA) and 0.06M of sodium hydroxide were dissolved, was added to the solution to be stirred for 30 minutes. When 2 to 3 mL of distilled water was added to the resultant solution, quantum dots were transferred into a water layer. The water layer was then separated, and then methanol and ethylacetate were added to the separated water layer so as to recover the quantum dots by way of centrifugation. Those quantum dots were then dispersed in water to fabricate 20 mL of monodispersed quantum dot aqueous solution ($2 \times 10^{-6}$M). Part of this solution was used to fabricate $5 \times 10^{-8}$M solution, whose fluorescence spectrum was then analyzed and the result was shown in (a) of FIG. 5. Also, 2.5 mL of this solution was diluted, and a diluted sodium hydroxide solution was used to adjust pH of this solution approximately to 10, thereby fabricating 20 mL of polyanionic monodispersed quantum dot CdSe/Cd($—SCH_2CH_2CO_2^-)_{ex}$ aqueous solution whose carboxylic acid on the quantum dot is in $—CO_2^-$ state. The aqueous solution was accordingly used for the reaction at the following step (5). Here, it was determined through a thermal analysis that more than 300 MPA molecules were bonded to the quantum dot surface per particle, so it is hereinafter indicated with ex.

(5) Fabrication of Superparamagnetic Silica Bead Having a Surface Doped with a Quantum Dot (Light-Emitting Nanoparticle) Layer The polycationic superparamagnetic silica bead solution fabricated at step (3) was slowly added into the polyanionic quantum dot solution fabricated at step (4) and shaken to be uniformly mixed with each other. The addition was stopped at a time point when the solution became dim, and then the solution was further shaken, thereafter being centrifuged. Fluorescence was rarely detected from the filtrate, so it was discarded, and the precipitate was dispersed in 100 mL of ethanol, thereby fabricating a superparamagnetic silica bead solution whose surface is doped with a quantum dot layer. The TEM image of the silica bead was shown in (c) of FIG. 3. $5 \times 10^{-8}$M solution was fabricated based upon quantum dots within the composite bead, and its fluorescence spectrum was shown in (b) of FIG. 5.

(6) Fabrication of Superparamagnetic Silica Bead Whose Inside is Doped with Quantum Dot (Light-Emitting Nanoparticle) Layer 100 mL of the superparamagnetic silica bead solution, fabricated at the step (5), having surface doped with the quantum dot (light-emitting nanoparticle) layer, was mixed with 3 mL of distilled water and 2 mL of ammonium hydroxide to be stirred for 30 minutes. Afterwards, 0.5 mL of tetraethyl orthosilicate (TEOS) was then added to the solution to be stirred for 5 hours, so as to grow another silica layer on the magnetic silica bead having the surface doped with the quantum dot layer, thereby fabricating a silica composite bead having a superparamagnetic nanoparticle cluster of about 150 nm in size at its center and having a doped quantum dot layer therein near the surface. The composite bead was washed more than three times using a magnet and ethanol, then dispersed in 10 mL of ethanol. The TEM image and the magnetic hysteresis measurement result of the silica composite bead were shown in (d) of FIG. 3 and (c) of FIG. 4, respectively. $5 \times 10^{-8}$M solution was fabricated based upon quantum dots within the composite bead, and its fluorescence spectrum was shown in (c) of FIG. 5. When the magnet was set near a vial containing the silica composite bead solution, all of the composite beads were attracted to the magnet within 10 minutes, and when the magnet was taken away and the vial was shaken, the solution was back to the originally dispersed state.

Example 2

Figure 6:
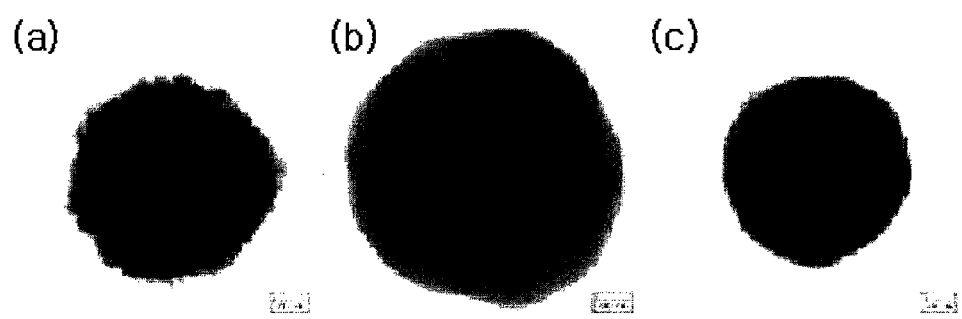
FIG. 6 is a TEM image of each of the following particles in accordance with a second embodiment of the present invention;
(a) a superparamagnetic cluster fabricated at step (1);
(b) a silica composite bead, fabricated at step (2), having a superparamagnetic cluster in a center; and
(c) a superparamagnetic cluster-light-emitting nanoparticles-silica composite bead fabricated at step (6).

Fabrication of Porous Composite Bead Comprising Superparamagnetic Cluster (About 340 nm) and Light-Emitting Nanoparticles Under the same conditions to step (1) of Example 1, the amount of $FeCl_3$ was increased to 0.975 g (6.0 mmol) to fabricate a superparamagnetic cluster of 340 nm in size, and the TEM image thereof was shown in (a) of FIG. 6. Afterwards, the processes from (2) to (6) of Example 1 were repeated to fabricate the superparamagnetic cluster-porous composite bead having the superparamagnetic cluster with the size of about 340 nm at its center, and the TEM image of the magnetic nanoparticle cluster-porous composite bead was shown in (b) of FIG. 6. Also, a superparamagnetic cluster-nanoparticles-silica porous composite bead with a final size of about 650 nm, having the superparamagnetic cluster of about 340 nm in size and having a doped quantum dot layer therein near the surface thereof was fabricated, and the TEM image thereof was shown in (c) of FIG. 6. When the magnet was set near a vial containing the silica composite bead solution, all of the composite beads were attracted to the magnet within 1 minute, and when the magnet was taken away and the vial was shaken, the solution was back to the originally dispersed state.

Example 3

Figure 7:
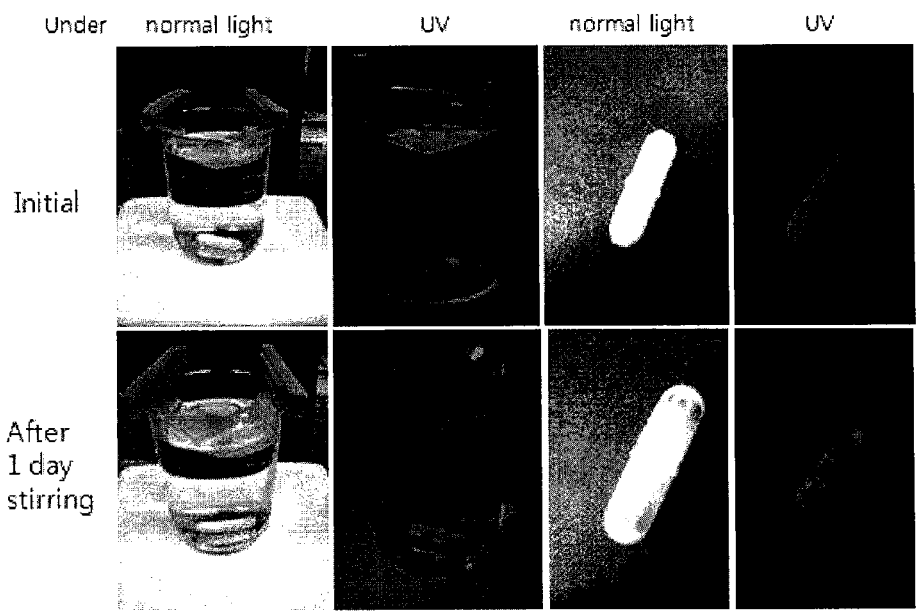
FIG. 7 shows pictures of comparison results before and after a dialysis membrane damage detection test in accordance with a third embodiment.

Dialysis Membrane Damage Detection Using Superparamagnetic Cluster-Light-Emitting Nanoparticles-Porous Composite Bead 5 fine pores were made through a dialysis jar using a needle of 10 μm injector. The pores with the average size of 500 μm were observed by use of an optical microscope. A solution prepared by dispersing 22 mg of the superparamagnetic cluster-light-emitting nanoparticles-porous composite bead, obtained as the final product in Example 1, in 10 mL of distilled water, was poured into a dialysis jar and then placed at a beaker containing 0.5 L of water, as shown in a picture of FIG. 7. Afterwards, the water in the beaker was stirred using a magnetic bar. FIG. 7 shows comparison pictures before and after a dialysis membrane damage detection test. Examining the picture irradiating 365 nm ultraviolet rays, at the beginning, no red fluorescence of the composite bead was detected at all at the magnetic bar. However, after one day, it was clearly visible to the naked eye that the composite beads, which vented from the dialysis jar, emitted the red fluorescence with being stuck onto the magnetic bar. Under a normal light, the composite beads vented from the dialysis jar were stuck onto the magnetic bar to be observed as a brown image. Consequently, it was exhibited that any tiny damage on a dialysis membrane could be simply easily detected by use of the composite beads fabricated in the preset invention.

Example 4

Figure 8:
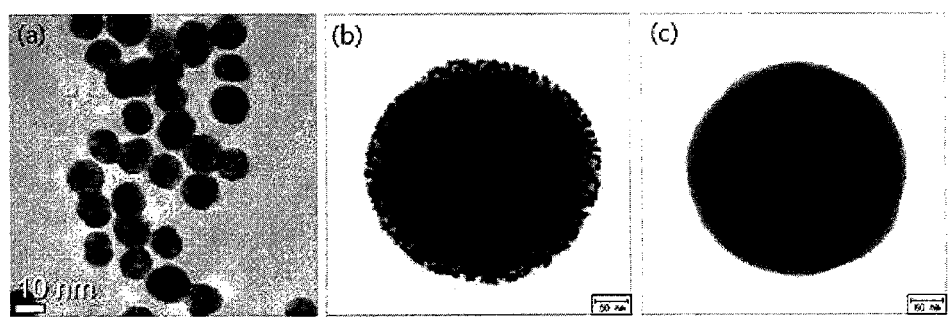
FIG. 8 is a TEM image of each particle in accordance with a fourth embodiment;
(a) a gold nanoparticle fabricated at step (2);
(b) a silica composite bead on which the gold nanoparticle layer is doped, fabricated at step (3); and
(c) a superparamagnetic cluster-gold-nanoparticles-silica composite bead fabricated at step (4).
Figure 9:
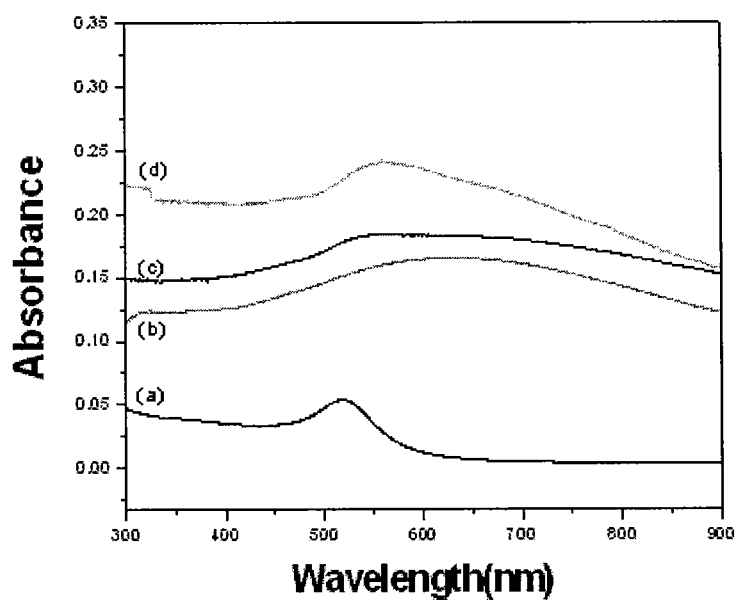
FIG. 9 is an absorption spectrum of each gold nanoparticle solution by a plasmon band in accordance with the fourth embodiment;
(a) a gold nanoparticle solution having chargeable molecules coupled thereto, fabricated at step (1);
(b) a superparamagnetic cluster-silica bead solution fabricated at step (2);
(c) a superparamagnetic cluster-silica bead solution having doped with a gold nanoparticle layer, fabricated at step (3); and
(d) a superparamagnetic cluster-gold nanoparticles-silica bead solution fabricated at step (4).

Fabrication of Porous Composite Bead Containing Superparamagnetic Cluster (About 340 nm) and Gold Nanoparticle (1) Fabrication of Polyanionic Monodispersed Gold Nanoparticle Au(citrate)$_{ex}$ Aqueous Solution Gold nanoparticle solution (having a diameter of about 13 nm and a concentration of $2.65 \times 10^{-7}$M), having a surface protected with citric acid, was composed. 10 Ml of this solution was taken to adjust its pH to about 10. A TEM image of the composed gold nanoparticle was shown in (a) of FIG. 8, and an absorption spectrum of $5 \times 10^{-9}$M solution was shown in (a) of FIG. 9.

(2) Fabrication of Polycationic Superparamagnetic Silica Bead Solution

A solution was prepared by adjusting pH of the superparamagnetic cluster-porous composite bead solution, which was obtained during the process of Example 2, contained at its center a superparamagnetic cluster with a size of about 340 nm, and had the surface coupled with aminopropyl group. An absorption spectrum of 0.02% of this prepared solution was shown in (b) of FIG. 9.

(3) Fabrication of Superparamagnetic Silica Bead Doped with Gold Nanoparticle Layer on Surface Thereof The polyanionic superparamagnetic silica bead solution, fabricated at the aforesaid step (2), was slowly added into the polycationic gold nanoparticle solution, fabricated at step (1) and shaken to be uniformly mixed together. The shaking of the solutions was stopped at a time point when they became misty, and then the mixed solution was further shaken to be centrifuged. The remainder was discarded because gold nanoparticle was rarely detected. Precipitates was dispersed in 100 Ml of ethanol so as to fabricate a superparamagnetic silica bead solution whose surface was doped with a gold nanoparticle layer. A TEM image of the silica bead was shown in (b) of FIG. 8. $5 \times 10^{-9}$M solution was fabricated based upon the gold nanoparticle within the composite bead, and its absorption spectrum was shown in (c) of FIG. 9.

(4) Fabrication of Superparamagnetic Silica Bead Having Gold Nanoparticle Layer Doped Inside Thereof 100 Ml of superparamagnetic silica bead solution, whose surface was doped with the gold nanoparticle layer, fabricated at step (3), was mixed with 3 Ml of distilled water and 2 Ml of ammonia water, to be stirred for 1 minute. Afterwards, 0.5 Ml of tetraethoxysilane (TEOS) was added to the solution and stirred for 3 hours, so as to grow a silica layer again on the magnetic silica bead having the gold nanoparticle layer doped thereon, thereby fabricating a silica composite bead, which had a superparamagnetic nanoparticle cluster with a size of about 340 nm at its center and had the gold nanoparticle layer doped to the inside adjacent to the surface thereof. The composed bead was washed more than 3 times using a magnet and ethanol, and thereafter dispersed in 10 Ml of ethanol. A TEM image of this silica bead was shown in (c) of FIG. 8. $5 \times 10^{-9}$M solution was fabricated based upon the gold nanoparticle within the composite bead, and its absorption spectrum was shown in (d) of FIG. 9. When the magnet was close to a container containing the silica bead solution, all the composite beads were attracted to the magnet within 1 minute, and when the solution was shaken after removing the magnet, it was returned to the originally dispersed solution.

In view of the fact that fluorescence or plasmon band was rarely detected from the solution in which an insoluble solvent was added to a post-reaction solution or the liquid which was discarded after centrifuging the post-reaction solution as it was, in Examples 1, 2 and 4, it could be understood that the fabrication of the nanoparticle layer-doped silica bead was achieved in a quantitative yield.

The foregoing embodiments and advantages are merely exemplary and is are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A superparamagnetic cluster-nanoparticles-porous composite bead comprising:
 a superparamagnetic cluster;
 a porous bead veiling the cluster; and
 nanoparticles radially distributed on an inner concentric sphere adjacent to an outer surface of the porous bead, wherein the nanoparticle is at least one type selected from a group consisting of light-emitting nanoparticle, magnetic nanoparticle, metallic nanoparticle and metal oxide nanoparticle.

2. The composite bead of claim 1, wherein the porous bead comprises a central porous bead having a surface of the concentric sphere coupled to the nanoparticles as an outer surface, and a porous layer formed to veil the nanoparticles coupled to the outer surface of the central porous bead by virtue of an electrostatic attraction.

3. The composite bead of claim 2, wherein the cluster has a size in the range of 50 nm to 1 μm, an inner diameter of the central porous bead is greater than a diameter of the cluster, an outer diameter of the central porous bead is less than 10 μm, a size of each nanoparticle is equal to or greater than 1 nm and smaller than 100 nm, and a thickness of the porous layer is greater than a diameter of each nanoparticle and less than 100 nm.

4. The composite bead of claim 1, wherein the concentric sphere is located between an inner surface and an outer surface of the porous bead.

5. The composite bead of claim 1, wherein the porous bead is composed of at least one selected from a group consisting of silica, titania, zirconia and zeolite.

6. A superparamagnetic cluster-nanoparticles-porous composite bead comprising:
   a cluster of superparamagnetic nanoparticles;
   a central porous bead veiling the cluster;
   nanoparticles radially coupled to an outer surface of the central porous bead by virtue of an electrostatic attraction; and
   a porous layer formed to veil the nanoparticles,
   wherein the nanoparticle is at least one type selected from a group consisting of light-emitting nanoparticle, magnetic nanoparticle, metallic nanoparticle and metal oxide nanoparticle.

7. The composite of claim 6, wherein each of the nanoparticles is located at the same distance from the center of the central porous bead so as to form an electrostatic monolayer.

8. The composite bead of claim 6, wherein the central porous bead and the porous layer are made of the same material.

9. The composite bead of claim 6, wherein each of the central porous bead and the porous layer is composed of at least one selected from a group consisting of silica, titania, zirconia and zeolite.

10. The composite bead of claim 1, wherein the light-emitting nanoparticle is at least one selected from a group consisting of II-VI compound semiconductor nanocrystals, III-V compound semiconductor nanocrystals and inorganic phosphors.

11. The composite bead of claim 10, wherein the light-emitting nanoparticle has one of (1) to (3) core/shell structures as follows:
   (1) II-VI compound semiconductor nanocrystal (core)/II-VI compound semiconductor nanocrystal (shell);
   (2) III-V compound semiconductor nanocrystal (core)/III-V compound semiconductor nanocrystal (shell); and
   (3) III-V compound semiconductor nanocrystal (core)/II-VI compound semiconductor nanocrystal (shell).

12. The composite bead of claim 10, wherein the II-VI compound semiconductor nanocrystal is at least one selected from a group consisting of CdS, CdSe, CdTe, ZnS, ZnSe, ZnTe, HgS, HgSe and HgTe, the III-V compound semiconductor nanocrystal is at least one selected from a group consisting of GaN, GaP, GaAs, InP and InAs, and an inorganic phosphor is at least one selected from a group consisting of $La_2O_2S:Eu$, $Li_2Mg(MoO_4):Eu,Sm$, $(Ba, Sr)_2SiO_4:Eu$, $ZnS:Cu,Al$, $SrGa_2S_4:Eu$, $Sr_5(PO_4)_3Cl:Eu$, $(SrMg)_5PO_4Cl:Eu$ and $BaMg_2Al_{16}O_{27}:Eu$.

13. The composite bead of claim 1, wherein the superparamagnetic nanoparticle is at least one selected from a group consisting of FeO, $Fe_2O_3$, $Fe_3O_4$, $MnFe_2O_4$, $CoFe_2O_4$, $NiFe_2O_4$, Fe, Co and Ni.

14. The composite bead of claim 1, wherein the metal is at least one selected from a group consisting of Au, Ag, Fe, Co and Ni.

15. The composite bead of claim 1, wherein the metal oxide is at least one selected from a group consisting of FeO, $Fe_2O_3$, $Fe_3O_4$, $MnFe_2O_4$, $CoFe_2O_4$ and $NiFe_2O_4$.

16. The composite bead of claim 6, wherein the light-emitting nanoparticle is at least one selected from a group consisting of II-VI compound semiconductor nanocrystals, III-V compound semiconductor nanocrystals and inorganic phosphors.

17. The composite bead of claim 6, wherein the superparamagnetic nanoparticle is at least one selected from a group consisting of FeO, $Fe_2O_3$, $Fe_3O_4$, $MnFe_2O_4$, $CoFe_2O_4$, $NiFe_2O_4$, Fe, Co and Ni.

18. The composite bead of claim 6, wherein the metal is at least one selected from a group consisting of Au, Ag, Fe, Co and Ni.

19. The composite bead of claim 5, wherein the metal oxide is at least one selected from a group consisting of FeO, $Fe_2O_3$, $Fe_3O_4$, $MnFe_2O_4$, $CoFe_2O_4$ and $NiFe_2O_4$.

* * * * *